United States Patent [19]

Adams

[11] 3,998,131
[45] Dec. 21, 1976

[54] ROTARY VALVE FOR POWER STEERING WITH HYDRAULIC REACTION

[75] Inventor: Frederick John Adams, Campton, England

[73] Assignee: Cam Gears Limited, Hitchin, England

[22] Filed: July 10, 1974

[21] Appl. No.: 486,994

Related U.S. Application Data

[63] Continuation-in-part of Ser. No. 437,930, Jan. 30, 1974.

[30] Foreign Application Priority Data

July 18, 1973 United Kingdom ............. 34230/73

[52] U.S. Cl. ................................. 91/372; 91/375 A
[51] Int. Cl.[2] ......................................... F15B 9/10
[58] Field of Search ................ 91/375 A, 370, 371, 91/372, 373, 434

[56] References Cited

UNITED STATES PATENTS

| | | | |
|---|---|---|---|
| 3,408,900 | 11/1968 | Tomita | 91/375 A |
| 3,433,127 | 3/1969 | Thompson | 91/375 A |
| 3,667,346 | 6/1972 | Duffy | 91/375 A |
| 3,733,967 | 5/1973 | Duffy | 91/375 A |

Primary Examiner—Paul E. Maslousky

[57] ABSTRACT

A hydraulic power assisted steering system includes a source of pressure fluid fed to a power assist motor. Control of the steering assistance pressure is provided by a valve having two valve elements which are relatively rotatable away from a centered position, subject to restraint imposed by an elastic torque rod. The pressure fluid source has its output branched, one branch supplying the steering assistance motor through and subject to the control of the rotatable valve, and the second branch supplying detent means adapted to increasingly resist relative rotation of the two valve elements in response to increases in pressure of the fluid source. The fluid source pressure increases with increasing relative rotation of the valve elements away from their centered position. Increasing fluid source pressure ultimately effects interlocking of the valve elements when the source pressure reaches a predetermined value. At that point, the torque bar, in effect, ceases being sensitive to increasing torque applied by the driver.

5 Claims, 2 Drawing Figures

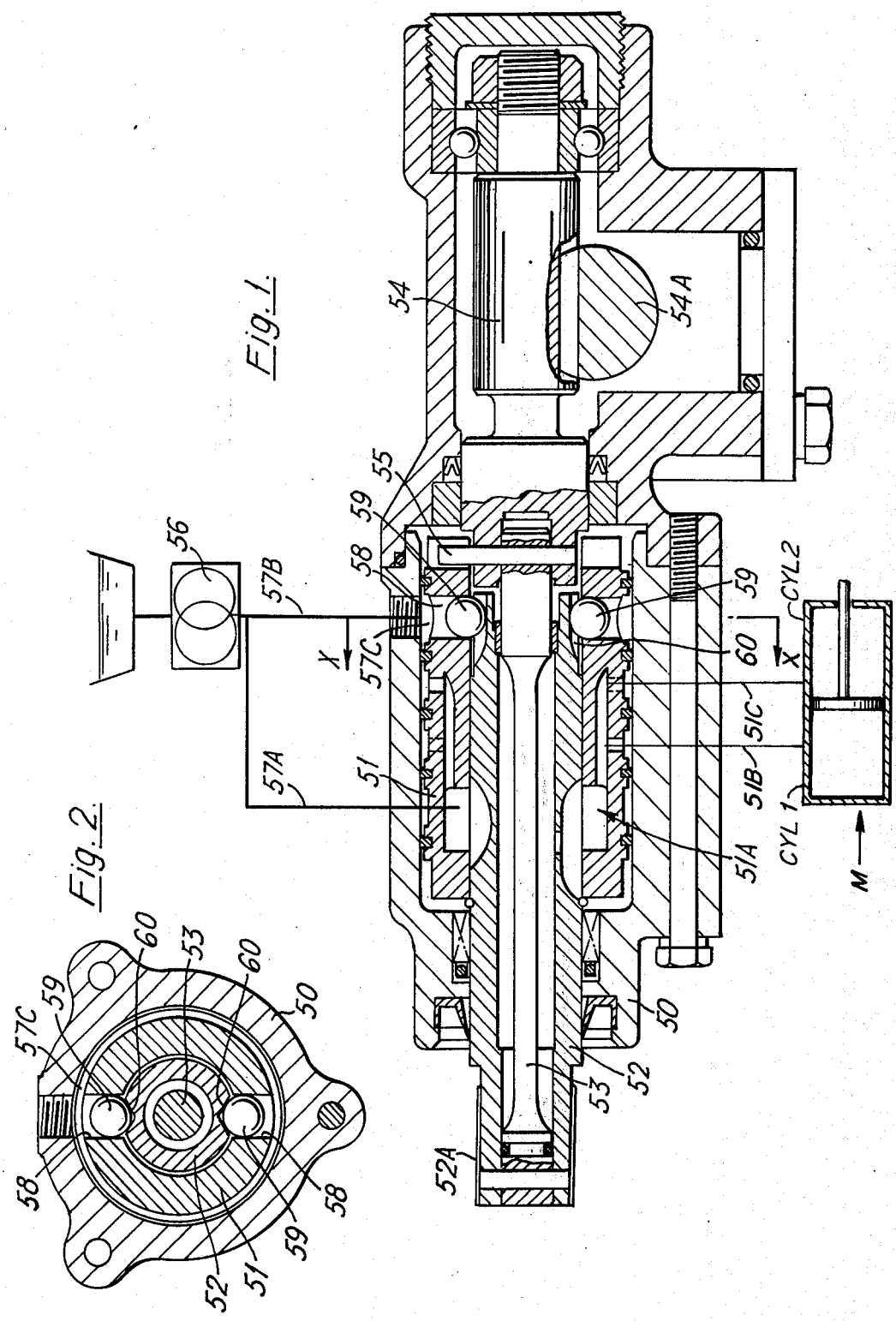

ROTARY VALVE FOR POWER STEERING WITH HYDRAULIC REACTION

This application is a continuation-in-part of my co-pending application Ser. No. 437,930, filed Jan. 30, 1974, and entitled "Power Assisted Vehicle Steering".

This invention relates to hydraulic powered control systems, with emphasis on power-assisted vehicle steering systems.

It is recognised in the art particularly of power-assisted steering of vehicles, that the effort applied by the operator (in the case of vehicles driver's (or steering wheel) torque) can be augmented in a proportional manner by deriving hydraulic energy from a source such as an engine-driven pump and controlling it by means of a valve which, being rotatable as a whole in the control operation, is actuated both in sense and extent by the elastic yield of a torsional element which we call a torque rod. In simple cases the augmentation or power assistance is proportional to the driver's torque either directly or following a valve law which is determined by selecting port areas, increments of port overlap per degree of angle, and related parameters. However, particularly in the case of vehicle steering, it has also been recognised that more power assistance may be desirable at low speeds (for example when maneuvering in heavy traffic, parking, etc.) than at high speeds; indeed to introduce power assistance at high speed may be dangerous, because the driver - at high speeds - should have to exert substantial effort to produce a given steering deflection as compared to his effort at low speed. The problem involved is one with which the invention of U.K. Pat. No. 1,243,192 is concerned; the present invention has a different approach to that problem.

Some proposals have been made to provide systems which took this "decrement" of assistance with "increment" of speed, into account, or to use a valve which is subjected to a fed-back reaction. One at least of such proposals, involved the idea that the effective length of a valve-controlling torque bar should be effectively decreased with speed increase, by allowing the hydraulic assistance pressure to slide one of the mechanical couplings to the torque bar along that bar so as to reduce its elastically effective length as the vehicle speed increased.

The primary object of the present invention is to adapt a valve of a kind which is known per se and which is in the category of valves which are introduced into a torsional element such as a steering column in such a manner that the torque in the element is measured or monitored and is reflected by the opening and closing of the valve in the two senses of possible torque direction; thus for example admitting more or less hydraulic fluid from a source such as an engine driven pump to a double-acting servomotor.

It is to valves of this general character that the invention applies. The basic aim is to use such a valve not as a speed proportional valve in the manner above indicated but as a rotary valve responsive reactively to the applied pressure, in particular with the aim of improving the "feel" of the control concerned in accordance with increase of power assistance.

According to the invention there is proposed a hydraulic power-assisted steering system in which the assistance pressure is controlled by a rotatable valve comprising two valve elements which are relatively rotatable subject to restraint by an elastic torque rod, the system having a source of pressure fluid of which the output is branched one branch supplying the assistance motor through and subject to the control of the valve and a second branch connecting the source to detent means operative between the two valve elements which detent means resist the relative rotation of the two elements by reason of interacting surfaces being urged by the source pressure into engagement such resistance being a function of the source pressure and of the profiles of interacting surfaces of the detent means.

Further, the invention involves that the rotatable valve is of the open-centre kind and in which the output pressure of the source is minimal when the valve is centred and increased when the elements of the valve are relatively rotated, so that increased driver's torque as sensed by the torque rod results in increase of the source pressure and therefore results in increase of the resistance caused by the detent means to relative rotation of the valve elements.

The invention further includes the feature that the detent means, preferably comprising a ball, or a plurality of balls, interacting with a V- or other section profiled recess, or recesses, such that the valve elements are in effect locked together when the source pressure reaches a predetermined valve, to the effect that in that situation the torque bar in effect ceases to be sensitive to increase of driver's torque.

The accompanying drawings illustrate in section one application of the invention, FIG. 2 being a cross section on line X — X of FIG. 1. The drawings represent a torque sensitive rotary valve. There is a valve body 50 which is stationary and in it is rotatable an outer valve element 51 within which, and extending from the bore of the body 50, is rotatable the inner valve element 52. Axially through the inner element 52 is the usual torque rod 53. The valve member 52 is rotated by the steering column of a vehicle which is connected to it (e.g. by splines 52A) at the left hand end of the drawing but is not shown. At the right hand end a driving pinion 54 engages the steering rack 54A and is rotated through a pin 55 by which the pinion 54 is connected to the (outer) valve element 51 which therefor is, in effect, a positive extension of the pinion.

The valve elements 51, 52 have the usual pressure chamber and passages generally indicated at 51A and circumferential grooves of the body between circumferential slits. These connect to two sides of a double-acting servomotor (The chambers of which are shown in FIG. 1 as "CYL1" and "CYL 2" formed on opposite sides of the double acting piston; servomotor M is connected to chamber/passages 51A by lines 51B and 51C) or alternatively to a return line leading to the fluid reservoir.

The valve elements 51, 52 form a valve of the open-centre kind and in which the output pressure of the source is minimal when the valve is centered and increased when the elements of the valve are relatively rotated. The details of valves of open-centre kind are known, per se, as evidenced by disclosures such as U.S. Pat. No. 3,022,722, and need not be described in any further detail.

The single engine-driven pump 56 has its outlet branched through lines 57A, 57B. The line 57A continuously supplied by pressure fluid from the pump 56 leads into an annular pressure chamber 51A. The line 57B leads into an annular pressure chamber 57C which is located between the outer element 51 and the body 50 and thus connects to radial cylindrical bores 58 in which are slidable steel balls 59 which in turn engage in V-sectioned recessed 60 made in the inner valve element 52. The recesses 60 are somewhat elongated axially to permit the small relative longitudinal movement inevitable between the valve elements 51, 52. In transverse section the recesses 60 are so shaped (e.g. V-sectioned as in FIG. 2) that the effect of their engagement when the balls 59 are thrust inwardly by the pressure of the line 57B follows a required relationship or law. Thus the effect of the balls 59 is to restrain, more, or less, according to the pressure in line 57B the action of the valve because the balls resist relative rotation between the elements 51 and 52. The shaping of the recesses 60 and their cooperation with the balls may be compared to that of cams and cam-followers the respective profiles of the recesses and balls determining the resistance to relative rotation of the elements 51 and 52. The recesses 60 being (for example) V-shaped, it will be clear that as the fluid pressure increases, so are the elements 51 and 52 increasingly locked toether and the profiles of the balls and recesses may be so selected that at a predetermined value of the pressure the elements are for practical purposes positively interlocked, so that the torque rod 53 is disabled and ceases to be torquesensitive. In that condition, the driver will have to exercise all of the torque required for steering which is in excess of that which is catered for by the power assistance. In short he will "feel" the necessity for applying supranormal torque. Since the valve is of the open-centre kind, the output pressure of the single engine driven pump 56 is minimal when the valve is in its centered position. As the elements of the valve are relatively rotated by operation of the steering column, the output pressure of pump 56 increases with a resulting increase in pressure branch 57B whereby resistance to rotation caused by increased pressure acting on the balls 59 increases. Thus, the action of the detent means comprised by balls 59 cooperating with recesses 60 is responsive to the increase in source output pressure engendered by rotation of the valve away from its central or neutral position, the rotation restraining action of the detent means increasing with increasing rotation of the valve elements away from the neutral position.

It may be noted that the recesses 60 do not necessarily have flat flanks such as are indicated by describing them as having V-section. Their flanks may be curved in section, since the designer may need to afford some required valve law (i.e. relationship between the restraining force, the source pressure, and the applied torque). It is again worth mentioning that the interation of the balls and recesses may be considered analagous to cam-followers and cams.

Driving dogs (not shown) but wellknown per se between valve element 52 and pinion 54 are provided to transmit driving torque when the torque bar 53 is twisted beyond a selected limit.

I claim:

1. A hydraulic power assisted vehicle steering system comprising an assistance motor, a source of pressure fluid, a valve comprising two valve elements which are relatively rotatable, a torsion bar element for biasing said valve elements to a neutral position and which resists relative movement of said valve elements from the neutral position, said source of pressure fluid having an output including a first output branch supplying pressure fluid to the assistance motor through and subject to the control of the relatively rotatable valve elements, detent means including a radially shiftable element movably carried by one of said valve elements and adapted, when subjected to fluid pressure to be urged radially, formations defining an opening on said one of said valve elements and a recess in another of said elements, said opening and recess cooperatively acting to engage with said radially shiftable element, said source of pressure fluid having a second output branch communicating with said source pressure and supplying pressure fluid to said radially shiftable element to urge said radially shiftable element in a radial direction to inhibit relative rotation between the two valve elements by reason of interengaging surface profiles of the radially shiftable element and said recess in said another element, said valve being of the type which controls fluid flow such that the source output pressure is minimal when the valve elements are in their neutral position and increases with increasing relative rotation of said valve elements away from their neutral position, said interengaging surface profiles of said radially shiftable element and said recess in said another element defining cam-like surfaces designed to control the resistance of the valve elements to the relative rotation therebetween as a function of the source output pressure and tending to convert increased radial movement of said radially shiftable element as a result of increased pressure in said second branch into increased resistance to relative rotational movement of said valve elements.

2. Hydraulic power-assisted vehicle steering system according to claim 1, in which the rotatable valve is of the open-centre kind and includes means whereby torque can be applied by a driver to said torque rod so that increased driver's torque as sensed by the torque rod results in increase of the source pressure and therefore results in increase of the resistance caused by the detent means to relative rotation of the valve elements.

3. A system acording to claim 1 in which the profiles of said interengaging surfaces of said radially shiftable element and said recess are such that the valve elements are in effect locked together when the source pressure reaches a predetermined value, to the effect that in that situation the torque bar in effect ceases to be sensitive to increase of the driver's torque.

4. A system according to claim 1 in which the radially shiftable element comprises a ball having an outer surface defining the interengaging surface profile of said radially shiftable element and in which said recess is V-sectioned, the flanks of which constitute said interengaging surface profile of said recess.

5. A system according to claim 1 wherein said valve is a torque-sensitive rotatable open-centre valve assembly of the kind in which said valve elements are inner and outer cylindrical coaxial valve elements and are interconnected by said torque rod, which is also coaxial with said valve elements, a stationary valve body defining means which rotatably supports said outer valve element, said valve body further defining first port means connected to said first output branch, said first port means being in fluid communication with said outer valve element so that flow from said first output branch to the power assistance motor is controlled by said valve elements, said radially shiftable element comrpising a ball which is in a sliding fit in a radial bore formed in said outer valve element and defining said opening, said recess having inclined flanks adapted to be engaged by such ball, surfaces defining an annular space between said stationary valve body and the outer valve element, and said valve body defining a second port connected to said second output branch and in fluid communication with said annular space so as to supply pressure fluid from said second output branch to said radial bore to urge said ball into engagement with said recess.

\* \* \* \* \*